United States Patent
Yoshioka et al.

(10) Patent No.: US 12,418,044 B2
(45) Date of Patent: Sep. 16, 2025

(54) SOLID-STATE BATTERY

(71) Applicant: Murata Manufacturing Co., Ltd., Nagaokakyo (JP)

(72) Inventors: Makoto Yoshioka, Nagaokakyo (JP); Akisuke Ito, Nagaokakyo (JP); Kenji Oshima, Nagaokakyo (JP); Kenichi Bando, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 718 days.

(21) Appl. No.: 17/714,529

(22) Filed: Apr. 6, 2022

(65) Prior Publication Data

US 2022/0231332 A1 Jul. 21, 2022

Related U.S. Application Data (63) Continuation of application No. PCT/JP2020/035563, filed on Sep. 18, 2020.

(30) Foreign Application Priority Data

Oct. 11, 2019 (JP) ................................ 2019-187900

(51) Int. Cl.
*H01M 10/0562* (2010.01)
*H01M 4/36* (2006.01)
(Continued)

(52) U.S. Cl.
CPC ....... *H01M 10/0562* (2013.01); *H01M 4/366* (2013.01); *H01M 10/0525* (2013.01); *H01M 50/117* (2021.01); *H01M 2300/0071* (2013.01); *H01M 2300/0094* (2013.01); *Y02E 60/10* (2013.01)

(58) Field of Classification Search
CPC ......... H01M 10/0525; H01M 10/0562; H01M 2300/0071; H01M 2300/0094; H01M 4/366; H01M 50/117; Y02E 60/10
See application file for complete search history.

(56) References Cited

U.S. PATENT DOCUMENTS

| | | | |
|---|---|---|---|
| 2007/0259271 A1 | 11/2007 | Nanno et al. | |
| 2019/0288246 A1* | 9/2019 | Kato | H01M 50/548 |
| 2019/0393505 A1* | 12/2019 | Suzuki | H01M 4/62 |

FOREIGN PATENT DOCUMENTS

| | | |
|---|---|---|
| JP | 2006351326 A | 12/2006 |
| JP | 2007005279 A | 1/2007 |

(Continued)

OTHER PUBLICATIONS

International Search Report in PCT/JP2020/035563, mailed Dec. 15, 2020, 4 pages.

*Primary Examiner* — Lingwen R Zeng
(74) *Attorney, Agent, or Firm* — ArentFox Schiff LLP (57) ABSTRACT

A solid-state battery that includes a battery element body including a positive electrode layer and a negative electrode layer stacked with respect to each other with a solid electrolyte layer interposed therebetween; and an exterior material covering a surface of the battery element body, wherein the exterior material is a sintered body containing a glassy material and at least two crystalline materials, and the glassy material and the at least two crystalline materials contain at least one common element.

14 Claims, 6 Drawing Sheets

(51) Int. Cl.
*H01M 10/0525* (2010.01)
*H01M 50/117* (2021.01)

(56) References Cited

FOREIGN PATENT DOCUMENTS

| | | |
|---|---|---|
| JP | 2013077486 A | 4/2013 |
| WO | 2018123319 A1 | 7/2018 |
| WO | 2018179580 A1 | 10/2018 |

* cited by examiner

SOLID-STATE BATTERY

CROSS REFERENCE TO RELATED APPLICATIONS

The present application is a continuation of International application No. PCT/JP2020/035563, filed Sep. 18, 2020, which claims priority to Japanese Patent Application No. 2019-187900, filed Oct. 11, 2019, the entire contents of each of which are incorporated herein by reference.

FIELD OF THE INVENTION

The present invention relates to a solid-state battery. More specifically, the present invention relates to a layered solid-state battery formed by stacking layers constituting a battery constituent unit.

BACKGROUND OF THE INVENTION

In the related art, secondary batteries that can be repeatedly charged and discharged have been used for various purposes. For example, the secondary battery has been used as a power source of an electronic device such as a smartphone and a notebook computer.

In a secondary battery, a liquid electrolyte (electrolytic solution) such as an organic solvent has been used in the related art as a medium for moving ions. However, the secondary battery using the electrolytic solution has a problem such as leakage of the electrolytic solution. Therefore, a solid-state battery including a solid electrolyte instead of a liquid electrolyte has been developed.

On the other hand, as an exterior material covering a battery element body which is a power generating element of a solid-state battery, an exterior material using a resin material has been proposed (for example, Patent Document 1).

Patent Document 1: Japanese Patent Application Laid-Open No. 2006-351326

SUMMARY OF THE INVENTION

However, the exterior material using a resin material has a problem that an effect of suppressing infiltration of water vapor in ambient atmosphere into a battery element body (hereinafter, referred to as a water vapor barrier property) is not sufficient. When the water vapor barrier property is low, moisture infiltrates into the battery element body, and a positive electrode layer, a negative electrode layer, and a solid electrolyte layer absorb the moisture, thereby deteriorating battery performance. On the other hand, the present inventors have studied an exterior material using a glass material, and as a result, while the water vapor barrier property is improved as compared with an exterior material using a resin material, the water vapor barrier property is still insufficient for practical use, and the mechanical strength is also insufficient.

Therefore, an object of the present invention is to provide a solid-state battery including an exterior material excellent in water vapor barrier property and mechanical strength.

In order to solve the above problems, a solid-state battery according to an aspect of the present invention includes a battery element body including a positive electrode layer and a negative electrode layer stacked with respect to each other with a solid electrolyte layer interposed therebetween; and an exterior material covering a surface of the battery element body, wherein the exterior material is a sintered body containing a glassy material and at least two crystalline materials, and the glassy material and the at least two crystalline materials contain at least one common element.

Further, a solid-state battery according to another aspect of the present invention includes a battery element body including a positive electrode layer and a negative electrode layer stacked with respect to each other with a solid electrolyte layer interposed therebetween; and an exterior material covering a surface of the battery element body, wherein the exterior material is a sintered body containing a glassy material and at least one crystalline material, and a volume fraction of the at least one crystalline material in the sintered body is 40 vol % to 99 vol %.

According to the present invention, it is possible to provide a solid-state battery including an exterior material excellent in water vapor barrier property and mechanical strength.

DETAILED DESCRIPTION OF THE INVENTION

Hereinafter, the "solid-state battery" of the present invention will be described in detail. Although the description will be made with reference to the drawings as necessary, the illustrated contents are only schematically and exemplarily illustrated for the understanding of the present invention, and appearances, dimensional ratios, and the like may be different from actual ones.

The term "solid-state battery" used in the present invention refers to a battery whose constituent elements are formed of a solid in a broad sense, and refers to an all-solid-state battery whose battery constituent elements (particularly preferably all constituent elements) are formed of a solid in a narrow sense. In a preferred aspect, the solid-state battery in the present invention is a layered solid-state battery configured such that layers constituting a battery constituent unit are stacked on each other, and preferably such layers are formed of a sintered body. The "solid-state battery" includes not only a so-called "secondary battery" capable of repeating charging and discharging but also a "primary battery" capable of only discharging. In a preferred aspect of the present invention, the "solid-state battery" is a secondary battery. The "secondary battery" is not excessively limited by the name, and may include, for example, a power storage device and the like.

The term "plan view" used in the present specification is based on a form in a case where an object is captured from the upper side or the lower side along a thickness direction based on a stacking direction of layers constituting the solid-state battery. In addition, the term "sectional view" used in the present specification is based on a form in a case of being viewed from a direction substantially perpendicular to a thickness direction based on a stacking direction of the layers constituting the solid-state battery (to put it briefly, a form in a case of being cut along a plane parallel to the thickness direction). The "vertical direction" and "horizontal direction" used directly or indirectly in the present specification correspond to a vertical direction and a horizontal direction in the drawings, respectively. Unless otherwise specified, the same reference numerals or symbols indicate the same members/portions or the same semantic contents. In one preferred aspect, it can be considered that a vertical downward direction (that is, a direction in which gravity acts) corresponds to a "downward direction" and the opposite direction corresponds to an "upward direction".

The various numerical ranges referred to herein are intended to include the lower limit and upper limit numerical values themselves, unless otherwise stated. That is, when a numerical range such as 1 to 10 is taken as an example, unless otherwise specified, it can be interpreted as including not only the lower limit value "1" but also the upper limit value "10".

First Embodiment

A solid-state battery according to a first embodiment includes a battery element body including a positive electrode layer and a negative electrode layer stacked with respect to each other with a solid electrolyte interposed therebetween; and an exterior material covering a surface of the battery element body, wherein the exterior material is a sintered body containing a glassy material and at least two crystalline materials, and the glassy material and the at least two crystalline materials contain at least one common element.

Figure 1:
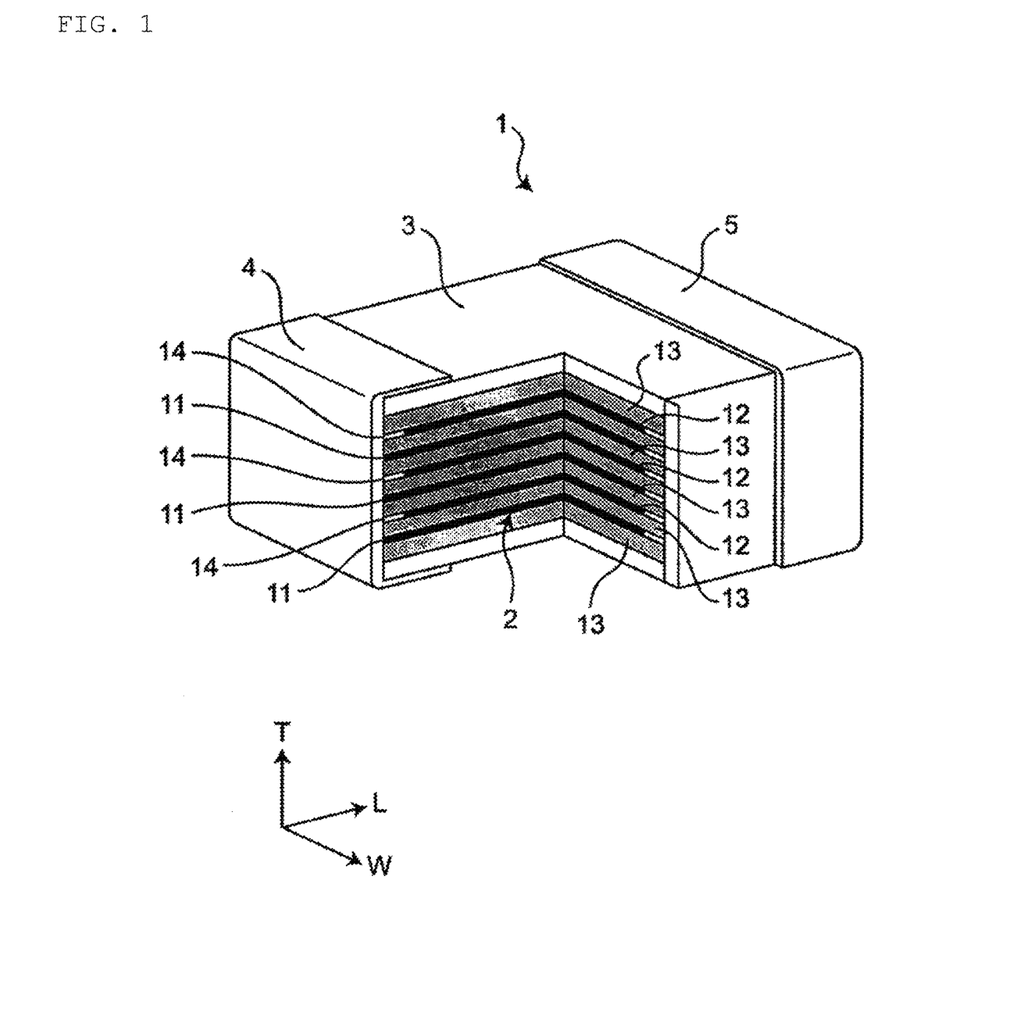
FIG. 1 is a partial cutout schematic perspective view illustrating an example of a structure of a solid-state battery according to a first embodiment of the present invention.

FIG. 1 is a partial cutout schematic perspective view illustrating an example of a structure of a solid-state battery 1 according to a first embodiment. The solid-state battery 1 includes a battery element body 2, an exterior material 3, a positive electrode terminal 4, and a negative electrode terminal 5. The battery element body 2 has a laminate structure in which a positive electrode layer 11 and a negative electrode layer 12 are stacked with a solid electrolyte layer 13 interposed therebetween. The battery element body 2 has a first end face (not illustrated) and a second end face (not illustrated) located on opposite sides, and a peripheral face disposed between the first end face and the second end face. An end face of the positive electrode layer 11 is exposed on the first end face, and an end face of the negative electrode layer 12 is exposed on the second end face. The exterior material 3 is provided so as to cover the peripheral face of the battery element body 2. In addition, the positive electrode terminal 4 covers the first end face of the battery element body 2, covers the first end face side of the peripheral face of the battery element body 2 via the exterior material 3, and is electrically connected to the positive electrode layer 11. In addition, the negative electrode terminal 5 covers the second end face of the battery element body 2, covers the second end face side of the peripheral face of the battery element body 2 via the exterior material 3, and is electrically connected to the negative electrode layer 12. An electrode separation portion 14 is provided on each of the first end face and the second end face to prevent direct contact between the positive electrode terminal 4 and the negative electrode layer 12 on the first end face and to prevent direct contact between the negative electrode terminal 5 and the positive electrode layer 11 on the second end face. In the drawing, T represents a height direction of the solid-state battery 1, L represents a length direction of the solid-state battery 1, and W represents a width direction of the solid-state battery 1.

The solid-state battery according to the present embodiment includes a battery element body (hereinafter, also referred to as a solid-state battery laminate) including at least one battery constituent unit including a positive electrode layer, a negative electrode layer, and a solid electrolyte layer interposed therebetween along a stacking direction, and an exterior material covering a surface of the battery element body.

In the solid-state battery, each layer constituting the solid-state battery is formed by firing, and a positive electrode layer, a negative electrode layer, a solid electrolyte, and the like form a sintered layer. Preferably, the positive electrode layer, the negative electrode layer, and the solid electrolyte are each fired integrally with each other, and therefore the solid-state battery laminate forms an integrally sintered body.

The positive electrode layer is an electrode layer containing at least a positive electrode active material. The positive electrode layer may further contain a solid electrolyte. For example, the positive electrode layer includes a sintered body including at least positive electrode active material particles and solid electrolyte particles. In a preferred aspect, the positive electrode layer is formed of a sintered body substantially containing only the positive electrode active material particles and the solid electrolyte particles. On the other hand, the negative electrode layer is an electrode layer containing at least a negative electrode active material. The negative electrode layer may further contain a solid electrolyte. For example, the negative electrode layer includes a sintered body including at least negative electrode active material particles and solid electrolyte particles. In a preferred aspect, the negative electrode layer is formed of a sintered body substantially containing only the negative electrode active material particles and the solid electrolyte particles.

The positive electrode active material and the negative electrode active material are substances involved in the transfer of electrons in the solid-state battery. Ions move (conduct) between the positive electrode layer and the negative electrode layer via the solid electrolyte, and electrons are transferred, and thereby the charging and discharging are performed. The positive electrode layer and the negative electrode layer are preferably layers capable of occluding and releasing sodium ions, lithium ions, and the like as ions, preferably lithium ions. That is, the solid-state battery is preferably an all-solid-state secondary battery in which sodium ions or lithium ions move between the positive electrode layer and the negative electrode layer via the solid electrolyte to charge and discharge the battery.

(Positive Electrode Active Material)

Examples of the positive electrode active material capable of occluding and releasing lithium ions include at least one selected from the group consisting of a lithium-containing phosphate compound having a NASICON-type structure, a lithium-containing phosphate compound having an olivine-type structure, a lithium-containing layered oxide, and a lithium-containing oxide having a spinel-type structure. Examples of the lithium-containing phosphate compound having a NASICON-type structure include $Li_3V_2(PO_4)_3$. Examples of the lithium-containing phosphate compound having an olivine-type structure include $LiFePO_4$ and $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

Examples of the positive electrode active material capable of occluding and releasing sodium ions include at least one selected from the group consisting of $Na_3V_2(PO_4)_3$, $NaCoFe_2(PO_4)_3$, $Na_2Ni_2Fe(PO_4)_3$, $Na_3Fe_2(PO_4)^3$, $Na_2FeP_2O_7$, and $Na_4Fe_3(PO_4)_2(P_2O_7)$, as a sodium-containing phosphate compound and $NaFeO_2$ as a sodium-containing layered oxide.

(Negative Electrode Active Material)

Examples of the negative electrode active material capable of occluding and releasing lithium ions include at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, a lithium-containing oxide having a spinel-type structure, and the like. Examples of the lithium alloy include Li—Al. Examples of the lithium-containing phosphate compound having a NASICON-type structure include $Li_3V_2(PO_4)_3$ and $LiTi_2(PO_4)_3$. Examples of the lithium-containing phosphate compound having an olivin-type structure include $LiCuPO_4$. Examples of the lithium-containing oxide having a spinel-type structure include $Li_4Ti_5O_{12}$.

Examples of the negative electrode active material capable of occluding and releasing sodium ions include at least one selected from the group consisting of a sodium-containing phosphate compound, and a transition metal oxide.

The positive electrode layer and/or the negative electrode layer may contain a conductive aid. Examples of the conductive aid contained in the positive electrode layer and the negative electrode layer include at least one kind of metal materials such as silver, palladium, gold, platinum, aluminum, copper, and nickel, and carbon.

Further, the positive electrode layer and/or the negative electrode layer may contain a sintering aid. Examples of the sintering aid include at least one selected from the group consisting of lithium oxide, sodium oxide, potassium oxide, boron oxide, silicon oxide, bismuth oxide, and phosphorus oxide.

The thicknesses of the positive electrode layer and the negative electrode layer are not particularly limited, and may be, for example, 2 µm to 50 µm, particularly 5 µm to 30 µm, independently of each other.

(Solid Electrolyte)

The solid electrolyte is a substance capable of conducting sodium ions or lithium ions. In particular, the solid electrolyte constituting a battery constituent unit in the solid-state battery forms a layer through which, for example, sodium ions or lithium ions can be conducted between the positive electrode layer and the negative electrode layer. The solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. Examples of the solid electrolyte capable of conducting lithium ions include a lithium-containing polyanionic compound having a NASICON structure, an oxide having a perovskite structure, and an oxide having a garnet-type structure or a garnet-type similar structure. Examples of the lithium-containing polyanionic compound having a NASICON structure include $Li_xM_y(PO_4)_3$ ($1 \leq x \leq 2$, $1 \leq y \leq 2$, and M is at least one selected from the group consisting of Ti, Ge, Al, Ga, and Zr), which is a lithium-containing phosphate compound. Examples of the lithium-containing phosphate compound having a NASICON structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type or garnet-type similar structure include $Li_7La_3Zr_2O_{12}$. Examples of the solid electrolyte capable of conducting sodium ions include a sodium-containing phosphate compound having a NASICON structure. Examples of the sodium-containing phosphate compound having a NASICON structure include $Na_xM_y(PO_4)_3$ ($1 \leq x \leq 4$, $1 \leq y \leq 2$, and M is at least one selected from the group consisting of Zr, Ti, Ge, Al, Ga, and Fe, a part of P may be substituted with Si, S, or the like).

The solid electrolyte layer may contain a sintering aid. The sintering aid contained in the solid electrolyte layer may be selected from, for example, materials similar to the sintering aid that can be contained in the positive electrode layer and/or the negative electrode layer.

The thickness of the solid electrolyte layer is not particularly limited, and may be, for example, 1 µm to 15 µm, particularly 1 µm to 5 µm.

(Exterior Material)

An exterior material is generally formed on the outermost side of the solid-state battery, and is for electrically, physically, and/or chemically protecting the solid-state battery. The exterior material used in the solid-state battery according to the present embodiment is a sintered body containing a glassy material and at least two crystalline materials, and the glassy material and the at least two crystalline materials contain at least one common element. It is difficult to obtain a fired body made of only a glassy material that is mechanically or chemically stronger than a crystalline material. In the present invention, by containing a common element, the at least two crystalline materials and the glassy material are strongly bonded to each other, so that a more dense fired body is easily formed as compared with a simple glass body, and the mechanical strength and chemical stability of the sintered body are improved. This makes it possible to improve the water vapor barrier property and the mechanical strength of the exterior material.

The common element contained in the glassy material and the at least two crystalline materials is at least one selected from the group consisting of Zn, Al, Si, and Mg, and is preferably Zn or Al.

Examples of the glassy material include borosilicate glass containing at least one selected from the group consisting of Zn, Al, Si, and Mg. Borosilicate glass containing Zn and/or Al is preferable.

Examples of the crystalline material include at least two selected from the group consisting of alumina ($Al_2O_3$), magnesium oxide (MgO), silicon oxide (SiO), silicon dioxide ($SiO_2$), garnite ($ZnAl_2O_4$), forsterite ($Mg_2SiO_4$), urastonite ($CaSiO_3$), anorthite ($CaAl_2Si_2O_8$), kayanite ($Al_2SiO_5$), silimanite ($Al_2SiO_5$), and andalsite ($Al_2SiO_5$). Preferably, at least two selected from the group consisting of alumina ($Al_2O_3$), garnite ($ZnAl_2O_4$), forsterite ($Mg_2SiO_4$), magnesium oxide (MgO), silicon oxide (SiO), and silicon dioxide ($SiO_2$) are used. More preferred are alumina ($Al_2O_3$) and garnite ($ZnAl_2O_4$), or alumina ($Al_2O_3$) and forsterite ($Mg_2SiO_4$). Here, as common elements, alumina has Al, magnesium oxide has Mg, silicon oxide and silicon dioxide have Si, garnite has Zn and Al, forsterite has Si and Mg, urastonite has Si, anorthite has Al and Si, kayanite, sirimanite, and andalusite have Al and Si.

The sintered body used in the present embodiment can be prepared by mixing a glassy material and at least two crystalline materials at predetermined mixing ratios, adding an organic material and a solvent to be mixed to form a paste, applying the paste to a predetermined substrate, and firing the paste. In addition, a paste can also be prepared using a raw material powder to be a glassy material and at least two crystalline materials by firing. As the raw material powders serving as the glassy material and the at least two crystalline materials, for example, crystallized glass powders can be used. A mixture of the crystallized glass powder and the at least two crystalline materials as necessary may be used as the raw material powder.

In addition, the crystalline materials have a particulate shape. The particles (hereinafter, also referred to as crystalline particles) of the crystalline materials are preferably dispersed in the glassy material. The average grain size of the crystalline particles is preferably 10 μm or less. Here, the average grain size of the crystalline particles can be determined by the following method. First, a cross section of the exterior material is prepared by ion milling or the like, and a cross-sectional SEM image is photographed. Next, 100 crystalline particles are randomly selected from the cross-sectional SEM image, the grain sizes of these particles are measured, and the average grain size is calculated by arithmetic averaging. When the particle is not spherical, the largest distance (so-called maximum Feret's diameter) among distances between two parallel lines drawn from all angles so as to be in contact with the contour of the particle is taken as the grain size of the particle.

In addition, the volume fraction of the glassy material in the exterior material is 1 vol % or more, preferably 1 vol % to 60 vol % from the viewpoint of securing the denseness of the sintered body. Here, the volume fraction of the glassy material can be determined by the following method. First, a procedure of preparing a cross section of the exterior material by ion milling or the like and photographing a cross-sectional SEM image is repeated to obtain a three-dimensional SEM image. Next, the volume fraction of the glassy material in the cube having a height of about the thickness of the exterior material is calculated from the three-dimensional SEM image.

Figure 2:
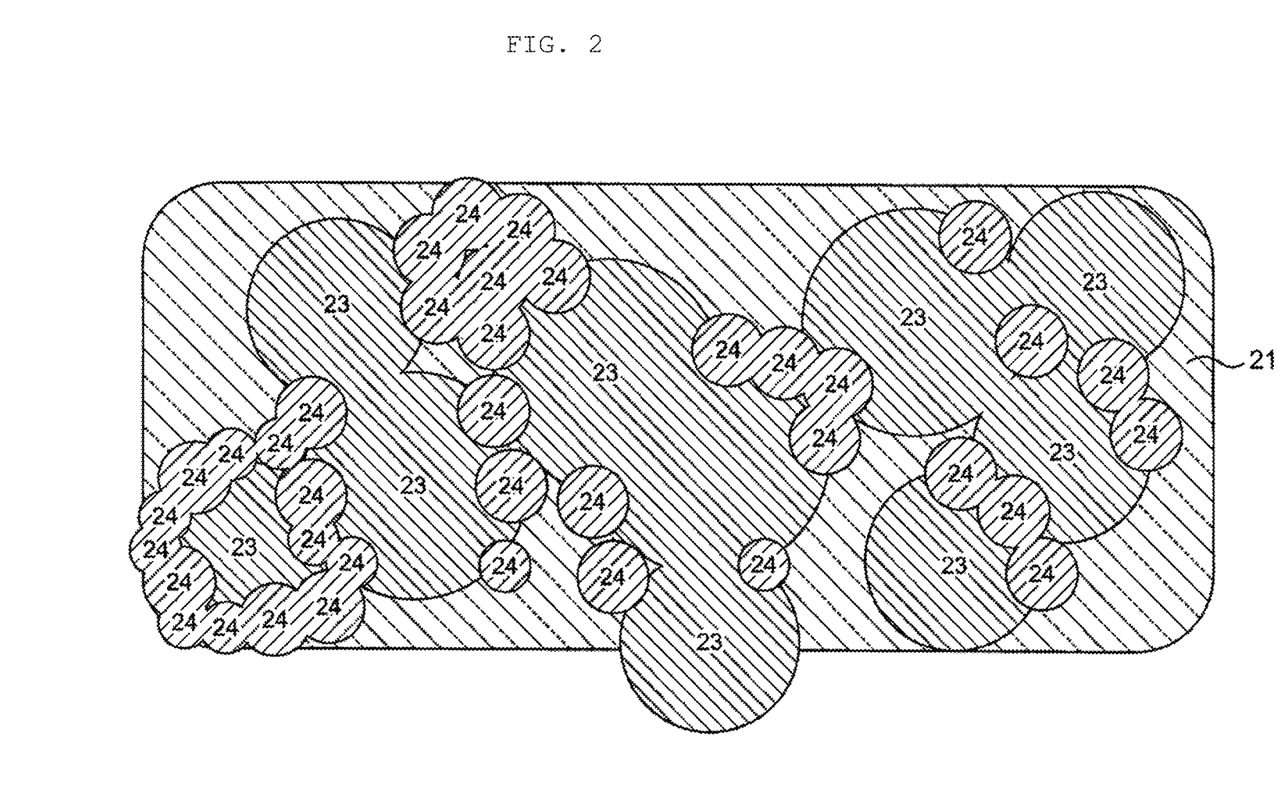
FIG. 2 is a schematic cross-sectional view illustrating an example of a structure of an exterior material of the solid-state battery according to the first embodiment of the present invention.

In addition, in the present embodiment, the two or more kinds of crystalline materials are dispersed in the glassy material. FIG. 2 is a schematic view illustrating an example of a cross-sectional structure of the exterior material in the present embodiment, and illustrates an example including two kinds of crystalline materials having a particle shape. A first crystalline material 23 and a second crystalline material 24 are dispersed in a glassy material 21. An average grain size of the first crystalline material 23 is larger than an average grain size of the second crystalline material 24. In addition, the first crystalline material 23 is polycrystalline. In addition, the second crystalline material 24 is present at the polycrystalline grain boundaries and/or at the interface between the first crystalline material 23 and the glassy material 21.

Figure 3:
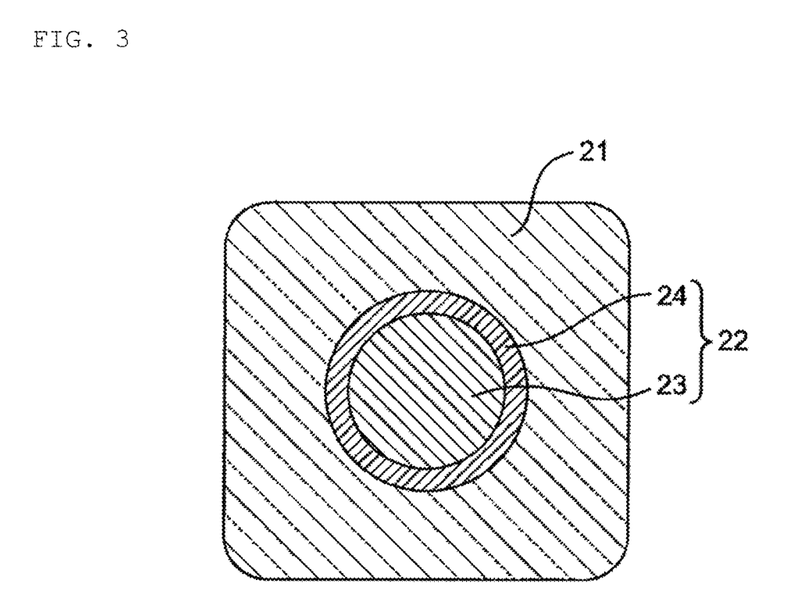
FIG. 3 is a schematic cross-sectional view illustrating an example of a structure of a crystalline material contained in the exterior material of the solid-state battery according to the first embodiment of the present invention.
Figure 4:
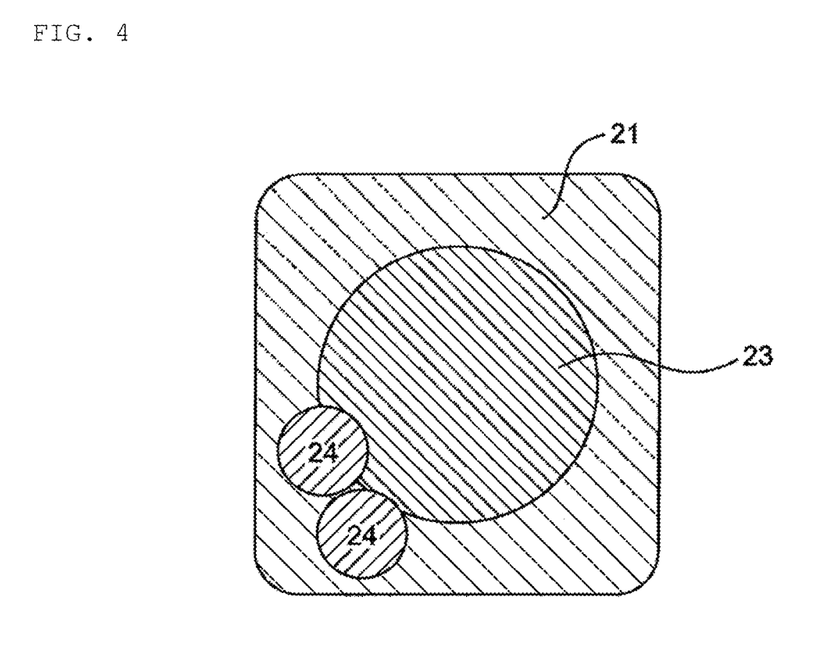
FIG. 4 is a schematic cross-sectional view illustrating another example of a structure of a crystalline material contained in the exterior material of the solid-state battery according to the first embodiment of the present invention.
Figure 5:
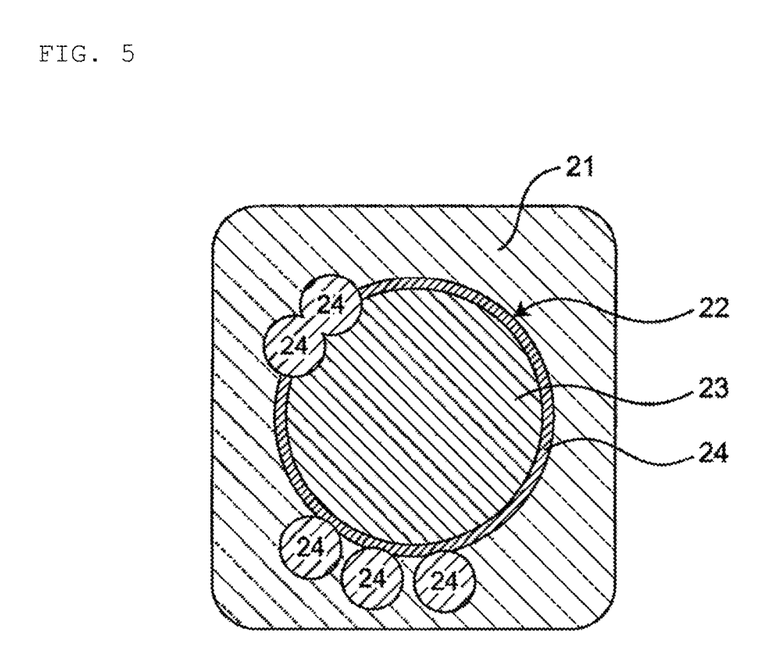
FIG. 5 is a schematic cross-sectional view illustrating another example of a structure of a crystalline material contained in the exterior material of the solid-state battery according to the first embodiment of the present invention.

FIGS. 3 to 5 are schematic views illustrating an example of a structure of the first crystalline material 23. FIG. 3 illustrates an example in which the crystalline material 22 has a core-shell structure with the first crystalline material 23 as a core and the second crystalline material 24 as a shell. FIG. 4 illustrates an example in which the second crystalline material 24 is supported on the surface of the first crystalline material 23. FIG. 5 is an example including both the structures of FIGS. 3 and 4, and illustrates an example in which the crystalline material 22 has a core-shell structure, and the second crystalline material 24 is supported on the surface of the shell. Here, examples of the combination of materials from which the core-shell structure is obtained include a case where the glassy material is borosilicate glass, the first crystalline material is alumina ($Al_2O_3$), and the second crystalline material is garnite ($ZnAl_2O_4$), and the first and second crystalline materials have a core-shell structure with alumina particles as a core part and garnite as a shell part. When the garnite of the shell part is strongly bonded to the glassy material, the denseness of the sintered body can be further improved. The first crystalline material is alumina ($Al_2O_3$), magnesium oxide (MgO), silicon oxide (SiO), silicon dioxide ($SiO_2$), or the like, and the second crystalline material is garnite ($ZnAl_2O_4$), forsterite ($Mg_2SiO_4$), or the like.

In addition, the moisture permeability of the exterior material is $1 \times 10^{-4}$ g/m$^2$/day or less, preferably $1 \times 10^{-5}$ g/m$^2$/day or less, and more preferably $1 \times 10^{-6}$ g/m$^2$/day or less from a viewpoint of securing the water vapor barrier property. Here, the moisture permeability of the exterior material can be determined by the following method. First, a part of the exterior material is taken out as a rectangular small piece by ion milling, polishing, or the like. Next, water vapor permeability (23° C., 90% RH) of the exterior material is measured in accordance with JIS K 7129 C (ISO 15106-4).

The exterior material is preferably insulating from the viewpoint of suppressing short circuit of the solid-state battery, and specifically, the ionic conductivity is $1 \times 10^{-7}$ S/cm or less, and preferably $1 \times 10^{-1}$ S/cm or less. Further, electron conductivity is $1 \times 10^{-7}$ S/cm or less, and preferably $1 \times 10^{-10}$ S/cm or less.

In addition, it is preferable that the exterior material be integrally sintered between the peripheral face of the battery element body and the sintered bodies. Here, the peripheral face of the battery element body in which the exterior material is integrally sintered is a side surface excluding an uppermost layer and a lowermost layer of the battery element body, and the first end face and the second end face on which the positive electrode terminal and the negative electrode terminal are formed. The uppermost layer and the lowermost layer of the battery element body may be a positive electrode layer or a negative electrode layer, or may be provided with a connection layer bonded to the exterior material. When the connection layer is bonded to the exterior material, integration of the battery element body and the exterior material is facilitated. A solid electrolyte layer containing a polyanionic compound is preferably used for the connection layer. Here, examples of the solid electrolyte containing a polyanionic compound include a lithium-containing phosphate compound as a lithium ion conductor and a sodium-containing phosphate compound as a sodium ion conductor. As the connection layer, a solid electrolyte layer containing at least one of the common elements described above can also be used. Here, the solid electrolyte layer containing at least one common element is a solid electrolyte layer containing at least one element selected from the group consisting of Zn, Al, Si, and Mg, and examples thereof include $Li_{1.5}Al_{0.5}Ge_{1.5}(PO_4)_3$ and $Li_{1.2}Al_{0.2}Ti_{1.8}(PO_4)_3$, $Li_{1.4}Mg_{0.2}Ti_{1.8}(PO_4)_3$.

From the viewpoint of integral sintering, the positive electrode layer, the negative electrode layer, and the solid electrolyte layer constituting the battery element body may contain at least one of the common elements described above. As such an example, the positive electrode layer may contain $Al_2O_3$, $SiO_2$, MgO, or the like in addition to the positive electrode active material and the solid electrolyte, the negative electrode layer may contain $Al_2O_3$, $SiO_2$, MgO, or the like in addition to the negative electrode active material and the solid electrolyte, and the solid electrolyte layer may contain $Al_2O_3$, $SiO_2$, MgO, or the like in addition to the solid electrolyte.

From the viewpoint of securing the water vapor barrier property and the mechanical strength, the thickness of the exterior material is 1 μm to 500 μm, and preferably 5 μm to 100 μm. Here, as the average thickness of the exterior material, an average thickness calculated from the thicknesses of 100 portions of the upper surface portion, the lower surface portion, and the side surface portion of the exterior material is used.

(Terminal)

The solid-state battery is generally provided with a terminal (for example, external terminal). In particular, a positive electrode terminal and a negative electrode terminal are provided on a first end face and a second end face located on opposite sides of the battery element body. More specifically, a positive electrode terminal connected to the positive electrode layer and a negative electrode terminal connected to the negative electrode layer are provided. As such a terminal, it is preferable to use a material having high conductivity. The material of the terminal is not particularly limited, and may be at least one selected from the group consisting of silver, gold, platinum, aluminum, copper, tin, and nickel.

[Method for Manufacturing Solid-State Battery]

Hereinafter, a method for manufacturing a solid-state battery according to a first embodiment of the present invention will be described.

The solid-state battery according to the first embodiment can be manufactured by combining a green sheet method using a green sheet, a printing method such as a screen printing method, and a dipping method. In one aspect, the solid electrolyte layer is formed by a green sheet method, the positive electrode layer and the negative electrode layer are formed by screen printing, and an exterior material is provided on the peripheral face of a laminate by a dipping method, and thereby the solid-state battery according to one embodiment of the present invention can be manufactured. Hereinafter, the description will be given on the premise of this aspect, but the present invention is not limited thereto, and a predetermined laminate may be formed by a green sheet method or a screen printing method.

(Step of Forming Unfired Laminate)

First, a solid electrolyte layer paste is applied onto a substrate (for example, a PET film). In addition, a paste for a positive electrode layer, a paste for a negative electrode layer, a paste for an electrode separation portion, and a paste for an exterior material are prepared.

The pastes can be prepared by wet-mixing a predetermined constituent material of each layer appropriately selected from the group consisting of a positive electrode active material, a negative electrode active material, a conductive material, a solid electrolyte material, an insulating material, and a sintering aid, and an organic vehicle in which an organic material is dissolved in a solvent. The paste for a positive electrode layer contains a positive electrode active material, a conductive material, a solid electrolyte material, an organic material, and a solvent. The paste for a negative electrode layer contains a negative electrode active material, a conductive material, a solid electrolyte material, an organic material, and a solvent. The paste for a solid electrolyte layer contains a solid electrolyte material, a sintering aid, an organic material, and a solvent. The paste for an electrode separation portion contains an insulating material (for example, a solid electrolyte material), a sintering aid, an organic material, and a solvent. The paste for an exterior material contains a glassy material, a crystalline material, an organic material, and a solvent.

In the wet mixing, a medium can be used, and specifically, a ball mill method, a viscomill method, or the like can be used. On the other hand, a wet mixing method without using a medium may be used, and a sandmill method, a high-pressure homogenizer method, or a kneader dispersion method may be used.

A supporting substrate is not particularly limited as long as it can support the unfired laminate, and for example, a substrate made of a polymer material such as polyethylene terephthalate can be used. When the unfired laminate is subjected to a firing step while being held on the substrate, a substrate having heat resistance to a firing temperature may be used as the substrate.

As the solid electrolyte material contained in the paste for a solid electrolyte layer, powders consisting of a lithium-containing phosphate compound having a NASICON structure, an oxide having a perovskite structure, and/or an oxide having a garnet-type structure or a garnet-type similar structure may be used.

As the positive electrode active material contained in the paste for a positive electrode layer, at least one from the group consisting of a lithium-containing phosphate compound having a NASICON-type structure, a lithium-containing phosphate compound having an olivine-type structure, a lithium-containing layered oxide, and a lithium-containing oxide having a spinel-type structure may be used.

As the negative electrode active material contained in the paste for a negative electrode layer, a negative electrode active material selected from at least one from the group consisting of an oxide containing at least one element selected from the group consisting of Ti, Si, Sn, Cr, Fe, Nb, and Mo, a lithium-containing phosphate compound having a NASICON-type structure, a lithium-containing phosphate compound having an olivine-type structure, and a lithium-containing oxide having a spinel-type structure, a material contained in the solid electrolyte paste described above, and a conductive material may be used.

The organic material that can be contained in the paste is not particularly limited, and at least one polymer material selected from the group consisting of a polyvinyl acetal resin, a cellulose resin, a polyacrylic resin, a polyurethane resin, a polyvinyl acetate resin, a polyvinyl alcohol resin, and the like can be used. The solvent is not particularly limited as long as the organic material can be dissolved, and for example, toluene and/or ethanol may be used.

As the sintering aid, at least one selected from the group consisting of lithium oxide, sodium oxide, potassium oxide, boron oxide, silicon oxide, bismuth oxide, and phosphorus oxide may be used.

The applied paste is dried on a hot plate heated to 30° C. or higher and 50° C. or lower to form a solid electrolyte layer sheet having a predetermined thickness on a substrate (for example, a PET film).

(Stacking Step of Battery Element Body)

Figure 6:
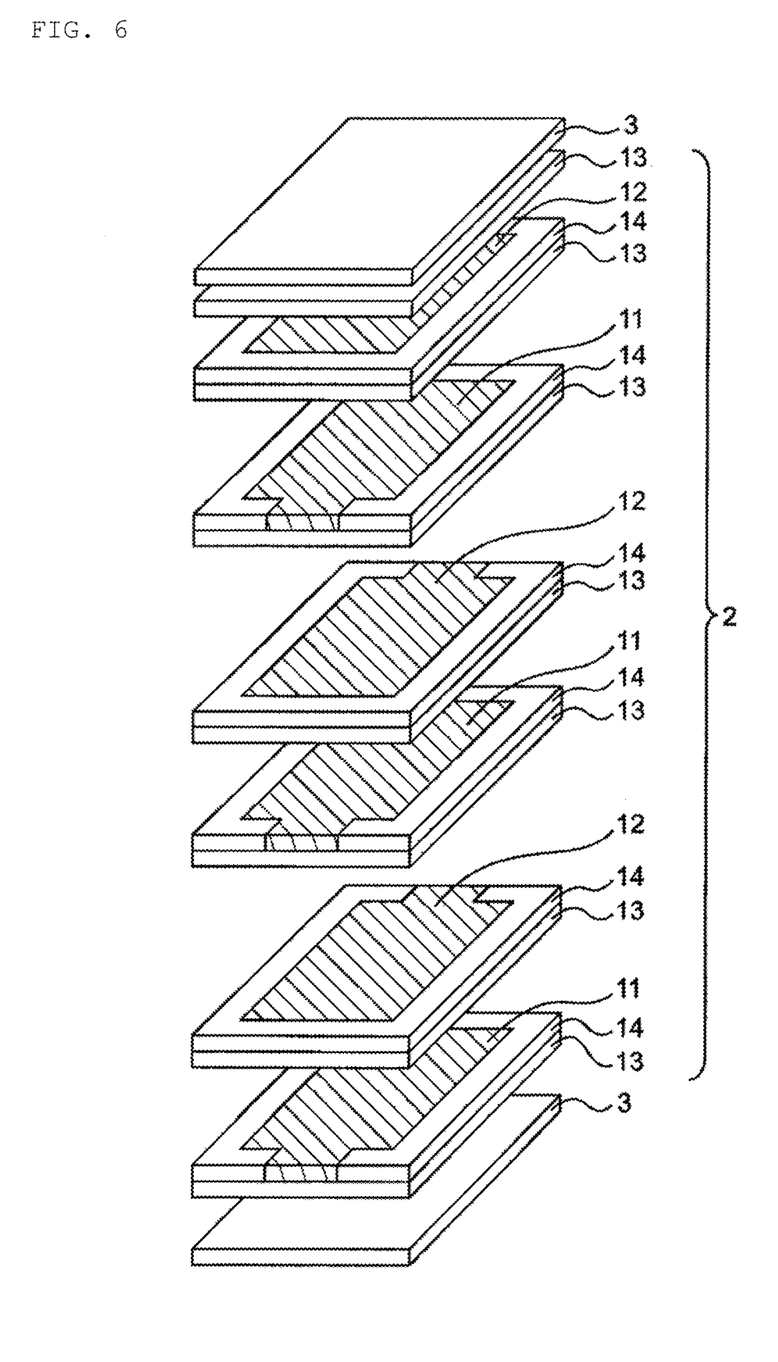
FIG. 6 is an exploded perspective view illustrating an example of a manufacturing step of the solid-state battery according to the first embodiment of the present invention.

FIG. 6 is an exploded perspective view of the solid-state battery illustrating an example of a stacking step of a battery element body 2. A solid electrolyte layer sheet 13 is peeled off from the substrate. A positive electrode layer 11 is formed on the solid electrolyte layer sheet 13 by screen printing, and an electrode separation portion 14 is formed around the positive electrode layer 11 by screen printing to prepare a positive electrode layer-integrated solid electrolyte layer sheet. In addition, a negative electrode layer 12 is formed on the solid electrolyte layer sheet 13 by screen printing, and an electrode separation portion 14 is formed around the negative electrode layer 12 by screen printing to prepare a negative electrode layer-integrated solid electrolyte sheet. The positive electrode layer-integrated solid electrolyte layer sheet and the negative electrode layer-integrated solid electrolyte sheet are alternately stacked with the solid electrolyte layer 13 interposed therebetween to obtain the battery element body 2 in which the solid electrolyte layer 13 is disposed as a connection layer on the uppermost layer and the lowermost layer. Subsequently, it is preferable to perform thermocompression bonding at a predetermined pressure (for example, about 50 MPa to about 100 MPa) and subsequent isotropic pressing at a predetermined pressure (for example, about 150 MPa to about 300 MPa). As described above, the predetermined battery element body 2 can be manufactured. Next, the uppermost surface and the lowermost surface of the battery element body 2 are dipped in the paste for an exterior material to form an exterior material 3. In addition, the side surface of the battery element body 2 where the end faces of the positive electrode layer and the negative electrode layer are not exposed is also dipped in the paste for an exterior material to form the exterior material 3.

(Firing Step)

In the firing step, an unfired laminate is subjected to firing. Although it is merely an example, the firing is performed by removing the organic material in a nitrogen gas atmosphere containing oxygen gas or in the atmosphere, for example, at 500° C., and then heating the organic material in a nitrogen gas atmosphere or in the atmosphere, for example, at 550° C. to 1000° C. The firing may be performed while pressurizing the unfired laminate in the stacking direction (in some cases, the stacking direction and a direction perpendicular to the stacking direction). Note that the firing may be performed at one time after providing the exterior material on the battery element body (simultaneous firing), or may be performed by providing the exterior material after firing the battery element body, and further performing firing (sequential firing).

Next, a terminal is attached to the obtained laminate. The terminal is provided so as to be electrically connectable to each of the positive electrode layer and the negative electrode layer. For example, it is preferable to form the terminal by dipping into a metal paste or the like. Although not particularly limited, the terminal is preferably formed of at least one selected from silver, gold, platinum, aluminum, copper, tin, and nickel.

In the above manufacturing method, the case where the solid-state battery is a lithium ion secondary battery has been described, but a solid-state battery which is a sodium ion secondary battery can also be manufactured by using a negative electrode active material or a positive electrode active material capable of occluding and releasing sodium ions and a solid electrolyte capable of conducting sodium ions.

According to the present embodiment, the water vapor barrier property and the mechanical strength of the exterior material can be improved.

Second Embodiment

Further, a solid-state battery according to a second embodiment of the present invention includes a battery element body including a positive electrode layer and a negative electrode layer stacked with respect to each other with a solid electrolyte layer interposed therebetween, and an exterior material covering a surface of the battery element body, wherein the exterior material is a sintered body containing a glassy material and at least one crystalline material, and a volume fraction of the at least one crystalline material in the sintered body is 40 vol % to 99 vol %.

The solid-state battery according to the present embodiment has the same configuration as the solid-state battery according to the first embodiment except that the exterior material is a sintered body containing a glassy material and at least one crystalline material, and a volume fraction of the at least one crystalline material in the sintered body is 40 vol % to 99 vol %.

In the present embodiment, the volume fraction of the at least one crystalline material in the sintered body is 40 vol % to 99 vol %. Preferably, the volume fraction of the at least one crystalline material in the sintered body is 50 vol % to 60 vol %. The glassy material in the sintered body bonds the crystalline materials to each other to improve denseness, but when the volume fraction of the glassy material increases, the mechanical strength of the sintered body decreases. In the present embodiment, by setting the volume fraction of the at least one crystalline material in the sintered body to 40 vol % to 99 vol %, it is possible to improve the denseness of the sintered body while suppressing a decrease in the mechanical strength of the sintered body.

Although not particularly limited, examples of the glassy material include at least one selected from the group consisting of soda lime glass, potash glass, borate glass, borosilicate glass, barium borosilicate glass, borite glass, barium borate glass, bismuth silicate glass, bismuth zinc borate glass, bismuth silicate glass, phosphate glass, aluminophosphate glass, and phosphite glass. Borosilicate glass is preferable. Examples of the crystalline material include alumina ($Al_2O_3$) and garnite ($ZnAl_2O_4$). Note that the glassy material and the crystalline material containing at least one selected from the group consisting of Zn, Al, Si, and Mg as common elements described in the first embodiment can also be used in the present embodiment as necessary.

Figure 7:
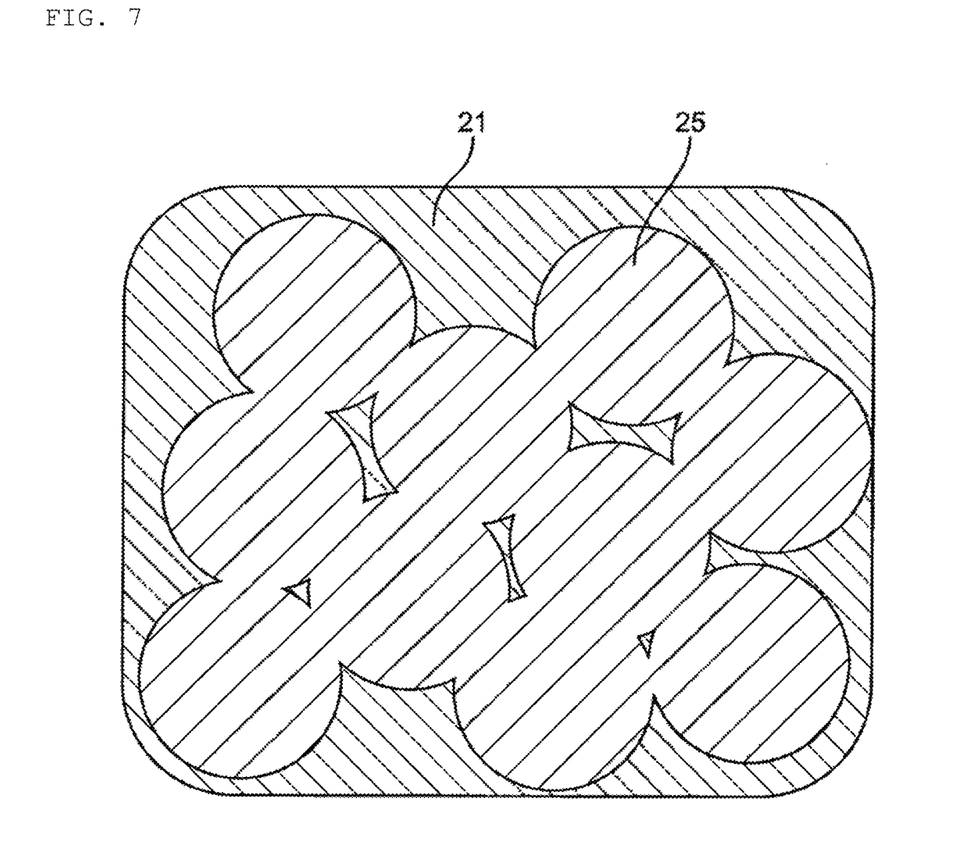
FIG. 7 is a schematic cross-sectional view illustrating an example of a structure of an exterior material of a solid-state battery according to a second embodiment of the present invention.

FIG. 7 is a schematic view illustrating an example of a cross-sectional structure of the exterior material in the present embodiment. In the present embodiment, a dense sintered body is obtained by bonding the crystalline materials 25 dispersed in the glassy material 21 to each other. When two or more kinds of crystalline materials are contained, the two or more kinds of crystalline particles may be separately dispersed in the glassy material.

The grain size of the crystalline particles is not particularly limited as long as the volume fraction of the crystalline material in the sintered body is 40 vol % to 99 vol %.

In the present embodiment, the specular reflectance of visible light of the exterior material is 6% or less, and preferably 3% or less. There is a case where the solid-state battery is suctioned and moved using a chip mounter or the like for mounting or the like, but there is a case where the imaging element of the chip mounter cannot accurately recognize the position of the solid-state battery if the reflectance of the exterior material is excessively high. In such a case, the position of the solid-state battery can be accurately recognized by reducing the reflectance of the exterior material. In addition, by reducing the reflectance, the appearance inspection of the solid-state battery becomes easy. Here, the specular reflectance of visible light of the exterior material can be obtained, for example, by measuring the specular reflectance of light incident at 30° using a gloss meter GM-060 (manufactured by Konica Minolta, Inc.).

Also in the present embodiment, the water vapor barrier property and the mechanical strength of the exterior material can be improved as in the case of the first embodiment.

Although the embodiments of the present invention have been described above, only typical examples have been illustrated. Therefore, those skilled in the art will easily understand that the present invention is not limited thereto, and various aspects are conceivable without changing the gist of the present invention.

The solid-state battery according to one embodiment of the present invention can be used in various fields where electric storage is assumed. Although it is merely an example, the solid-state battery of the present invention can be used in the fields of electricity, information, and communication in which mobile equipment, and the like are used (for example, mobile equipment fields including mobile phones, smartphones, notebook computers and digital cameras, activity meters, arm computers, electronic papers), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a research submarine), and the like.

DESCRIPTION OF REFERENCE SYMBOLS

1: Solid-state battery
2: Battery element body
3: Exterior material
4: Positive electrode terminal
5: Negative electrode terminal
11: Positive electrode layer
12: Negative electrode layer
13: Solid electrolyte layer
14: Electrode separation portion
21: Glassy material
22, 25: Crystalline material
23: First crystalline material
24: Second crystalline material

The invention claimed is:

1. A solid-state battery comprising:
a battery element body including a positive electrode layer and a negative electrode layer stacked with respect to each other with a solid electrolyte layer interposed therebetween; and
an exterior material covering a surface of the battery element body,
wherein the exterior material is a sintered body containing a glassy material and at least two crystalline materials, and the glassy material and the at least two crystalline materials contain at least one common element, and
wherein the glassy material is borosilicate glass containing Zn or Al, and the crystalline material is at least two selected from the group consisting of alumina, magnesium oxide, silicon oxide, silicon dioxide, garnite, and forsterite.

2. The solid-state battery according to claim 1, wherein the common element is at least one selected from the group consisting of Zn, Al, Si, and Mg.

3. The solid-state battery according to claim 1, wherein the glassy material is borosilicate glass containing Zn or Al, and the crystalline material is alumina and garnite.

4. The solid-state battery according to claim 1,
wherein the battery element body further includes a connection layer disposed on an uppermost layer and a lowermost layer in a stacking direction and bonded to the exterior material, and
the connection layer includes a solid electrolyte containing a polyanionic compound.

5. The solid-state battery according to claim 1,
wherein the battery element body further includes a connection layer disposed on an uppermost layer and a lowermost layer in a stacking direction and bonded to the exterior material, and
the connection layer includes a solid electrolyte containing the at least one common element.

6. The solid-state battery according to claim 1, wherein the solid electrolyte layer, the positive electrode layer, and the negative electrode layer contain the at least one common element.

7. The solid-state battery according to claim 1, wherein a volume fraction of the glassy material in the exterior material is 1 vol % to 60 vol %.

8. The solid-state battery according to claim 1, wherein the at least two crystalline materials include a first crystalline material and a second crystalline material arranged in a core-shell structure with the first crystalline material as a core and the second crystalline material as a shell.

9. The solid-state battery according to claim 1, wherein the at least two crystalline materials include a first crystalline material and a second crystalline material in which the second crystalline material is supported on the surface of the first crystalline material.

10. The solid-state battery according to claim 1, wherein the at least two crystalline materials include a first crystalline material and a second crystalline material arranged in a core-shell structure with the first crystalline material as a core and the second crystalline material as a shell and with the second crystalline material additionally supported on a surface of the shell.

11. The solid-state battery according to claim 1, wherein a moisture permeability of the exterior material is $1 \times 10^{-4}$ g/m$^2$/day or less.

12. The solid-state battery according to claim 1, wherein the exterior material has an ionic conductivity of $1 \times 10^{-7}$ S/cm or less.

13. A solid-state battery comprising:
a battery element body including a positive electrode layer and a negative electrode layer stacked with respect to each other with a solid electrolyte layer interposed therebetween; and an exterior material covering a surface of the battery element body,
- wherein the exterior material is a sintered body containing a glassy material and at least two crystalline materials, and the glassy material and the at least two crystalline materials contain at least one common element, and
- wherein the at least two crystalline materials include a first crystalline material and a second crystalline material, and an average grain size of the first crystalline material is larger than an average grain size of the second crystalline material.

14. The solid-state battery according to claim 13, wherein the first crystalline material is polycrystalline, and the second crystalline material is present at a grain boundary of the polycrystalline and/or an interface between the first crystalline material and the glassy material.

* * * * *